Sept. 20, 1966  H. LYON  3,273,357
CLUTCH
Filed Jan. 27, 1964
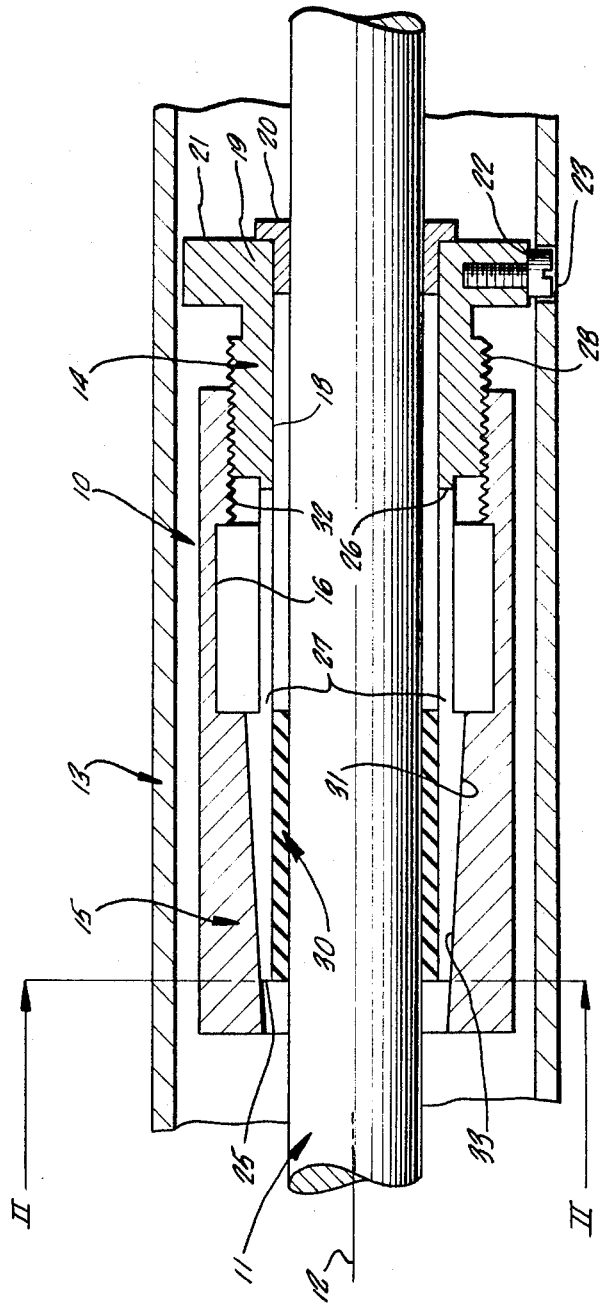
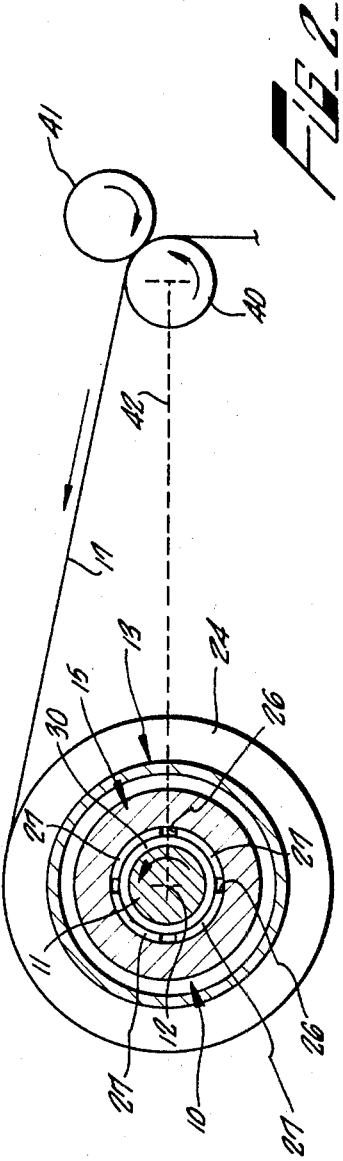
INVENTOR.
HOWARD LYON
BY
Christie, Parker & Hale
ATTORNEYS.

United States Patent Office 3,273,357
Patented Sept. 20, 1966

3,273,357
CLUTCH
Howard Lyon, La Canada, Calif., assignor to Consolidated Electrodynamics Corporation, Pasadena, Calif., a corporation of California
Filed Jan. 27, 1964, Ser. No. 340,204
5 Claims. (Cl. 64—30)

This invention relates to a clutch and, more particularly, to a clutch which eliminates single turn variations in output torque due to eccentricity (or its equivalent) between the input and output members of the clutch.

A recording oscillograph is a data recording instrument in which a spot of light is caused to move transversely of the path of motion of a moving photosensitive record sheet. The spot of light moves in response to variations of an analog input signal to record a record of the variations of the input signal. In such devices space is frequently at a premium. Where the record sheet is to be reeled after exposure to the light spot, it is desired that the record be rolled into as small a diameter roll as possible. Where the tension in the record sheet adjacent the take-up reel varies non-uniformly during the reeling process, the resulting roll often is of larger diameter than is necessary. For example, a roll of photosensitive recording paper as supplied from the manufacturer thereof may have a diameter of three inches. Because of variations in the tension in the paper as it approaches the take-up reel, the roll of paper formed on the take-up reel may have a diameter of three and one-half inches. The increased roll size is caused almost entirely by cyclic variations in the tension in the paper. Such variations in paper tension are themselves caused by corresponding cyclic variations in the torque applied to the take-up reel.

This invention provides a slip clutch having particular utility in the drive mechanism for a take-up reel in a recording oscillograph. The clutch is connected between an input shaft and the reel itself. Preferably the reel is disposed concentric to the drive shaft. The improved clutch isolates any eccentricity which may exist between the input shaft and the take-up reel so that there is no variation in the torque applied to the take-up reel during a single turn of the drive shaft. Accordingly, the torque applied to the take-up reel is essentially constant and the exposed recording paper introduced to the take-up reel is coiled tightly and evenly upon the reel so that the complete roll is of minimum diameter. Accordingly, less space may be allotted to the take-up reel than was previously possible and the oscillograph either may be made smaller or the capacity of the take-up reel may be increased.

Generally speaking, the invention provides a clutch for coupling a rotatable circular drive shaft having an axis of rotation to a hollow driven member disposed coaxially thereof. The clutch comprises a sleeve circumferentially of the shaft between the shaft and the driven member. Friction means are carried by the sleeve and are captive thereto and are frictionally engaged with the shaft substantially circumferentially thereof. Coupling means are provided for coupling the sleeve to the driven member so that the sleeve is secure from angular motion relative to the driven member. The coupling means also are provided for absorbing any eccentricity between the shaft surface and the shaft axis which may be manifested during angular motion of the sleeve relative to the shaft in response to imposition upon the driven member of a load which is sufficient to cause the friction means to slip angularly relative to the shaft.

The above-mentioned and other features of the invention are more fully set forth in the following detailed explanation of the invention, taken in conjunction with the accompanying drawings wherein:

FIG. 1 is an enlarged, longitudinal, cross-sectional elevation view of a clutch according to this invention; and FIG. 2 is a cross-sectional elevation view taken along line II—II of FIG. 1 showing the clutch in relation to a take-up reel and a metering roller of a recording oscillograph, for example.

FIGURES 1 and 2 show a slip clutch 10 according to this invention coupled between a circularly cylindrical drive shaft 11, which is rotatable about an axis 12, and a cylindrical hollow driven member 13 disposed concentric to the drive shaft. The clutch itself includes a collet sleeve 14 and a cylindrical adjustment nut member 15 having an axial bore 16 through its elongate extent. As shown, the driven member has an internal diameter which is greater than the diameter of the shaft 11. Clutch 10 is disposed in the annular space between the drive shaft and the driven member.

In the following description driven member 13 is referred to as a take-up reel drum of a recording oscillograph for a sheet 17 of photosensitive oscillographic recording paper. It will be understood, however, that clutch 10 may be used in other devices wherein cyclic variations in the torque applied to the driven member is objectionable.

Collet sleeve 14 has an axial bore 18 through its elongate extent of diameter greater than the diameter of drive shaft 11. One end 19 of the collet sleeve is rotatably mounted to shaft 11 by a bushing 20 disposed between the sleeve and the drive shaft. The collet sleeve adjacent to and preferably opposite from the bushing defines a radially extending circumferential annular flange 21 which has an outer diameter less than the inner diameter of take-up reel drum 13. End 19 of the collet sleeve is substantially pivotally coupled to the take-up reel drum at essentially a single point of the collet sleeve. The coupling between the sleeve and the drum is such that the drum and collet sleeve are secured from angular motion relative to one another. The coupling is effected by a driving stud 22 which extends radially outwardly from collet sleeve flange 21 and is engaged in a cooperating aperture 23 of the take-up reel drum. As shown in FIG. 1, stud 22 may be the head of a machine screw which is threaded into the collet sleeve flange. Aperture 23 of the take-up reel drum mates with the circumference of the driving stud so that there is no lateral play between the stud and the drum. The stud, however, is movable radially of the drum in order to accommodate any eccentricity of the cylindrical surface of the shaft relative to axis 12. Such an eccentrictiy is sensed by the collet sleeve and is transferred to the driving stud as the sleeve rotates about the shaft. Preferably the outer end of the driving stud is recessed inwardly of the outer circumference of the take-up reel drum so as not to interfere with a coil 24 (see FIG. 2) of the oscillographic recording material 17 coiled upon drum 13.

Collet sleeve 14 has a second end 25 opposite from end 19. A plurality of slots 26 are formed axially through the collet sleeve at regularly spaced apart intervals circumferentially of the sleeve. The slots extend from end 25 partially along the sleeve toward end 19. Accordingly, the collet sleeve defines a corresponding plurality of cantilevered spring fingers 27. In order that cantilevered fingers 27 may be resilient laterally of the elongate extent of the collet sleeve, it is preferred that the sleeve be fabricated from a material such as steel or a suitable plastic which has inherent resilience.

Between the supported ends of fingers 27 and flange 21 the exterior surface of the collet sleeve defines a helical thread 28.

Friction means are frictionally engaged with the shaft about its circumference. The friction means preferably is provided in the form of a cylindrical sleeve 30 of "Dacron" felt, for example, which is disposed at and adjacent to sleeve end 25. "Dacron" is a trademark owned and used by E. I. du Pont de Nemours & Co., Inc., Wilmington, Delaware, to identify its polyethylene terephthalate polyester resins and fibers thereof. Sleeve 30 is deformable and, when pressure is applied thereto by fingers 27, the friction material bulges or extrudes into slots 26 so that the friction material is captive to the collet sleeve and is not angularly movable relative to the sleeve.

The outer circumferential extent of the collet sleeve adjacent end 25 is tapered linearly to define an inclined outer surface 31 on each of spring fingers 27. Preferably surfaces 31 are inclined toward shaft axis 12 proceeding away from collet sleeve flange 21.

Adjustment nut 15 defines an internal helical thread 32 at one end of bore 16. Thread 32 is engaged with thread 28 of the collet sleeve so that the position of the adjustment nut relative to the collet sleeve is adjustable axially of shaft 11. Adjustment nut bore 16 opposite from thread 32 is tapered, as at 33, to mate with the tapered exterior surface of the collet sleeve. Accordingly, nut 15 provides selectively operable means which are operable by axial movement of the nut relative to the collet sleeve to move the cantilevered ends of fingers 27 toward and away from shaft 11. Such movement of the cantilevered fingers varies the radially acting normal forces of friction which exist between the inner surface of friction sleeve 30 and the surface of shaft 11. The shear force which must exist between the friction material and the shaft before the collet sleeve slips relative to the shaft therefore is variable in magnitude.

As shown in FIG. 2, the drive shaft of take-up reel drum 13 is disposed in a recording oscillograph adjacent a rotatable metering roller 40. An idler roller 41 is disposed adjacent the metering roller and a sheet of oscillographic recording paper 17 is passed between the metering roller and the idling roller to take-up reel drum 13. The metering roller is driven at a predetermined angular velocity by means not shown. The take-up reel drive shaft 11 is rotated in response to rotation of the metering roller as indicated by dashed line 42 (see FIG. 2) connecting the axes of the metering roller and shaft 11. Shaft 11 is rotated at a rate which is so related to the rotational velocity of the metering roller that the outer circumference of take-up reel drum 13 has a greater angular velocity than the circumference of the metering roller, assuming that drum 13 and shaft 11 rotate together. When sheet 17 is coupled to drum 13, however, the outer surface of the drum can have a velocity no greater than the rate at which the sheet passes the metering roller. Accordingly, collet sleeve 14 slips relative to the drive shaft 11 as the drive shaft is rotated.

Because the input or drive member to clutch 10 is a shaft, the outer surface of the shaft may be machined easily and economically to define a substantially perfectly circular cylinder. If, however, the cylinder defined by the surface of the shaft is eccentric to the axis 12, the eccentricity causes the collet sleeve to oscillate about the axis as the shaft rotates within the collet sleeve. This eccentricity, and any collet sleeve oscillation produced thereby, is isolated from pick-up reel drum 13 because of the single-point sliding connection of the collet sleeve with the drum. Accordingly, the torque transmitted to the drum is not subject to variation during a single turn of shaft 11 when slip exists between the drum and the shaft. Accordingly, oscillographic recording paper 17 is wound evenly upon drum 13 and the resulting roll of the record on the drum has a minimum diameter.

Clutch 10 is particularly compact and its novel structure enables it to be installed between the concentric shaft and driven sleeve without increasing the diameter of the sleeve.

From the foregoing description it will be apparent to workers skilled in the art that this invention provides a slip clutch which reduces variations in output torque for a single turn of the input shaft to extremely low values. Workers skilled in the art will also understand that clutch 10 may be used in devices other than a recording oscillograph. While the invention has been described in conjunction with specific apparatus and a specific application thereof, this has been by way of example only and is not to be considered as limiting the scope of this invention.

What is claimed is:

1. A clutch for coupling a rotatable drive shaft to a driven member disposed axially thereof comprising a collet sleeve disposed circumferentially of the shaft between the shaft and the driven member, means coupling one end of the collet sleeve and the driven member for securing the collet sleeve from angular motion relative to the driven member about the axis of the shaft and for accommodating movement of the collet radially relative to the driven member, a plurality of slots formed through the collet sleeve at and adjacent to the other end of the collet sleeve to define a corresponding plurality of cantilevered fingers, friction means engaged with the shaft about its circumference and captive to the cantilevered ends of the fingers, and selectively operable means coupled to the collet sleeve operable to move the cantilevered ends of the fingers toward and away from the shaft for varying the radial forces of engagement of the friction means with the shaft.

2. A clutch for coupling a rotatable drive shaft to a driven member disposed concentric thereto comprising a collet sleeve disposed circumferentially of the shaft between the shaft and the driven member, means coupling the collet sleeve and the driven member at essentially a single point common thereto for securing the collet sleeve from angular motion relative to the driven member, a plurality of slots formed through the collet sleeve at and adjacent to the other end of the collet sleeve to define a corresponding plurality of cantilevered fingers, a sleeve of friction material disposed interiorly of and engaged with the ends of the fingers so as to be angularly immovable relative thereto, and selectively operable means coupled to the collet sleeve operable to move the cantilevered ends of the fingers toward and away from the shaft for varying the radial forces of engagement of the friction sleeve with the shaft.

3. A clutch for coupling a rotatable drive shaft to a driven member disposed concentric thereto comprising a collet sleeve dispsed circumferentially of the shaft between the shaft and the driven member, means coupling the collet sleeve and the driven member at essentially a single point common thereto for securing the collet sleeve from angular motion relative to the driven member, a plurality of slots formed through the collet sleeve at and adjacent to the other end of the collet sleeve to define a corresponding plurality of cantilevered fingers, a sleeve of deformable friction material disposed interiorly of the cantilevered ends of the fingers in circumferential engagement with the shaft, and selectively operable means coupled to the collet sleeve operable to move the cantilevered ends of the fingers toward and away from the shaft for varying the radial forces of engagement of the friction sleeve with the shaft, the friction material deforming into the slots between the fingers so that the sleeve of friction material is secure from angular movement relative to the sleeve.

4. A clutch for coupling a rotatable drive shaft to a driven member disposed concentric thereto comprising a collet sleeve disposed circumferentially of the shaft between the shaft and the driven member, a pin extending radially of the collet sleeve into registration with a recess in the driven member for securing the collet sleeve from angular motion relative to the driven member and for accommodating radial movement of the sleeve relative to the driven member, a plurality of slots formed through the collet sleeve at and adjacent to the other end of the collet sleeve to define a corresponding plurality of cantilevered fingers, the outer surfaces of the fingers being inclined relative to the axis of the drive shaft, a sleeve of deformable friction material disposed interiorly of the cantilevered ends of the fingers in circumferential engagement with the shaft, the outer circumference of the collet sleeve adjacent the supported ends of the fingers defining a helical thread, and an elongated axially bored nut member disposed circumferentially of the collet sleeve, one end of the nut member defining an internal helical thread engaged with the collet sleeve thread so that the nut member is adjustable axially of the collet sleeve, the bore at the other end of the nut member being tapered to mate with the inclined surfaces of the fingers so that movement of the nut member axially of the collet sleeve varies the radial forces of engagement of the friction material with the shaft, the friction material normally being deformed to protrude between the fingers so that it is secured from angular movement relative to the collet sleeve.

5. A slip clutch for coupling a rotatable circularly cylindrical shaft having an axis of rotation to a hollow driven member disposed coaxially of the shaft comprising a sleeve disposed circumferentially of the shaft between the shaft and the driven member, friction means carried by the sleeve and captive thereto and substantially circumferentially frictionally engaged with the shaft, and means for coupling the sleeve to the driven member to secure the sleeve from angular motion relative to the driven member and for absorbing any eccentricity between the shaft surface and the shaft axis during angular motion of the sleeve relative to the shaft in response to imposition upon the driven member of a load which is sufficient to cause the friction means to slip relative to the shaft.

References Cited by the Examiner

UNITED STATES PATENTS

| | | | |
|---|---|---|---|
| 298,317 | 5/1884 | Sherman | 287—52.06 |
| 904,341 | 11/1908 | Lindstrom | 287—52.06 X |
| 1,722,625 | 7/1929 | Cooper | 64—31 |
| 1,835,168 | 12/1931 | McKean | 64—30 |
| 2,466,129 | 4/1949 | Stoner | 279—48 |
| 2,872,199 | 2/1959 | Cox et al. | 279—47 |
| 2,992,844 | 7/1961 | Williams | 287—52.06 |
| 3,024,630 | 3/1962 | Billups | 64—30 |
| 3,058,321 | 10/1962 | Aske | 64—11 |

MILTON KAUFMAN, *Primary Examiner.*

BROUGHTON G. DURHAM, D. H. THIEL,
*Assistant Examiners.*